(12) United States Patent
Ohnishi

(10) Patent No.: US 9,511,599 B2
(45) Date of Patent: Dec. 6, 2016

(54) PRINTING APPARATUS, PRINTING METHOD, AND INK SET

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 108 days.

(21) Appl. No.: 14/283,224

(22) Filed: May 21, 2014

(65) Prior Publication Data

US 2014/0347421 A1 Nov. 27, 2014

(30) Foreign Application Priority Data

May 24, 2013 (JP) .................... 2013-109942

(51) Int. Cl.
*G01D 11/00* (2006.01)
*B41J 2/21* (2006.01)
(Continued)

(52) U.S. Cl.
CPC ............... *B41J 2/21* (2013.01); *B41J 2/2107* (2013.01); *B41J 11/002* (2013.01); *C09D 11/102* (2013.01);
(Continued)

(58) Field of Classification Search
CPC ............. B41J 2/01; B41J 2/0057; B41J 2/05; B41J 2/1433; B41J 2/15; B41J 2/155; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/0256; B41M 5/52; B41M 5/5218; B41M 7/00; B41M 7/0072; B41M 7/0081; C09D 11/005; C09D 11/30; C09D 11/32; C09D 11/322; C09D 11/324; C09D 11/328; C09D 11/36; C09D 11/38; C09D 11/40; C09D 11/52; C09D 11/54; C09D 11/101
(Continued)

(56) References Cited

U.S. PATENT DOCUMENTS 4,952,942 A 8/1990 Kanome et al.
2003/0144377 A1* 7/2003 Sano ............... C09D 11/40
523/160
(Continued)

FOREIGN PATENT DOCUMENTS

EP 2228223 9/2010
JP H11-048502 2/1999
(Continued)

OTHER PUBLICATIONS

"Preliminary Rejection of Korea Counterpart Application", issued on Aug. 11, 2015, with English translation thereof, p. 1-p. 10, in which the listed references (KR2003-0025170 and JPH11-048502) were cited.
(Continued)

*Primary Examiner* — Erica Lin
(74) *Attorney, Agent, or Firm* — Jianq Chyun IP Office

(57) ABSTRACT

The present disclosure provides ways to more appropriately perform high-quality printing with gradation inks. The disclosure provides a printing apparatus for printing using an inkjet scheme. The apparatus includes a plurality of inkjet heads that eject ink droplets of a first-color ink of at least one color selected from a plurality of colors. The plurality of inkjet heads respectively eject ink droplets of different concentrations of the first-color ink (magenta or cyan). At least one of the plurality of inkjet heads ejects ink droplets
(Continued)

of a resin dispersed ink, and the resin dispersed ink is a ink in which dispersing particles of a colored binder resin as a dispersoid is dispersed in a dispersion medium.

10 Claims, 4 Drawing Sheets

(51) Int. Cl.
- *B41J 11/00* (2006.01)
- *C09D 11/102* (2014.01)
- *C09D 11/322* (2014.01)
- *C09D 11/328* (2014.01)
- *C09D 11/40* (2014.01)

(52) U.S. Cl.
CPC ........... *C09D 11/322* (2013.01); *C09D 11/328* (2013.01); *C09D 11/40* (2013.01)

(58) Field of Classification Search
USPC ............ 347/95–100; 106/31.13, 31.27, 31.6, 106/31.65, 31.85, 31.77, 31.75; 523/160, 523/161
See application file for complete search history.

(56) References Cited

U.S. PATENT DOCUMENTS

| | | | |
|---|---|---|---|
| 2004/0017406 A1 | 1/2004 | Kato et al. | |
| 2005/0173307 A1* | 8/2005 | Sakasai | B41J 2/01 209/128 |
| 2007/0229577 A1 | 10/2007 | Morimoto | |

FOREIGN PATENT DOCUMENTS

| | | |
|---|---|---|
| JP | 2001-152063 | 6/2001 |
| JP | 2005-111666 | 4/2005 |
| JP | 3936558 | 6/2007 |
| KR | 2003-0025170 | 3/2003 |
| WO | 2007130345 A2 | 11/2007 |
| WO | 2007130345 A3 | 11/2007 |

OTHER PUBLICATIONS

"1st Office Action of China Counterpart Application", with English translation thereof, issued on Jul. 31, 2015, p. 1-p. 13.

"Search Report of European Counterpart Application", issued on Sep. 29, 2014, p. 1-p. 7, in which the listed references were cited.

* cited by examiner

PRINTING APPARATUS, PRINTING METHOD, AND INK SET

CROSS REFERENCE TO RELATED APPLICATIONS

This application claims the priority benefit of Japanese application serial no. 2013-109942, filed on May 24, 2013. The entirety of the above-mentioned patent application is hereby incorporated by reference herein and made a part of this specification.

BACKGROUND

Technical Field

The present invention relates to a printing apparatus, a printing method, and an ink set.

Description of Background Art

Inkjet printers are in wide use in a variety of fields. Wider applications and improving performance of inkjet printers have created a demand for high-quality inkjet printing.

One way of achieving high-quality printing with an inkjet printer is to reduce the volume of ink droplets ejected from inkjet heads. A problem, however, is that this method involves misting, which occurs during the ejection of ink droplets from the inkjet heads to the media when the ejected ink droplet volume is excessively small. This makes it difficult to reduce the ink droplet volume when the volume is equal to or smaller than, for example, about 1 pl (picoliter).

Recently, a technique that uses a plurality of inks of different concentrations for printing of the same color has attracted interest as a method of further improving print quality without changing ink droplet volume. Specifically, for example, a method is known in which lighter color inks are used for the magenta (M) and cyan (C) colors of YMCK inks, in addition to using these inks in normal concentrations (see, for example, U.S. Pat. No. 4,952,942).

When a high-concentration ink (hereinafter, "dark ink") and a low-concentration ink (hereinafter, "light ink") of the same color are used, a sufficiently high concentration and a sufficiently low concentration are desired for the dark ink and the light ink, respectively, when, for example, printing accuracy is to be improved over a wider brightness range. It is also desired to sufficiently increase the concentration of the dark ink when, for example, prints are to be made in high concentration with a thin ink layer. However, there are potential problems associated with increasing dark ink concentration and decreasing light ink concentration.

For example, a pigment may be used as a colorant to increase dark ink concentration. Here, increasing the pigment content for increased concentration increases the risk of, for example, pigment aggregation, and may fail to properly produce ink. In addition, ink droplets cannot be properly ejected through inkjet heads when, for example, ink viscosity is increased to prevent pigment aggregation. It is thus not always easy to sufficiently increase dark ink concentration when using gradation inks.

The light ink can have sufficiently low concentrations, for example, when a pigment of small particle diameter is used, or when a dye is used as the colorant. However, this may lower the weather resistance of the ink, for example, with respect to light and water, etc. Indeed, it is not always easy to, for example, sufficiently lower light ink concentration when using gradation inks.

In using gradation inks, there is a need for more appropriate ways of making high-quality prints with dark and light inks of more desirable properties. The present invention provides a printing apparatus, a printing method, and an ink set as a solution to the foregoing problems.

SUMMARY

The present inventor conducted intensive studies, and found that dark and light inks of more desirable properties can be produced when inks (resin dispersed inks) dispersing colored binder resin particles as a dispersoid in a dispersion medium are used as dark and light inks. It was also found that these inks can be used to more appropriately perform high-quality printing. The present invention can solve the foregoing problems with the following configurations.

Configuration 1: A printing apparatus for printing using an inkjet scheme, the apparatus including: a plurality of inkjet heads that eject ink droplets of a first-color ink of at least one color selected from a plurality of colors, wherein the plurality of inkjet heads respectively eject ink droplets of different concentrations of the first-color ink, and at least one of the plurality of inkjet heads ejects ink droplets of a resin dispersed ink, and the resin dispersed ink is a ink in which dispersing particles of a colored binder resin as a dispersoid is dispersed in a dispersion medium.

The colorant is, for example, a pigment or a dye, and is dispersed in the binder resin particles to color these particles. When the colorant is a dye, dispersing the colorant in the binder resin particles means, for example, dissolving the colorant in the binder resin particles. The binder resin particles may be colored with, for example, both a pigment and a dye. The first-color ink is, for example, an ink that develops the first color upon being printed. The first-color ink may be an ink that develops the first color upon being fixed to a medium. Specifically, when inks of YMCK (YMCK inks) are used for printing, the first color may be, for example, M (magenta) or C (cyan). In this case, the printing apparatus preferably includes a plurality of inkjet heads that eject ink droplets of different concentrations for each of the magenta ink and the cyan ink.

With the foregoing configuration, the plurality of inkjet heads respectively eject ink droplets of a high-concentration dark ink and a low-concentration light ink of the first color. It is therefore possible with the foregoing configuration to appropriately use, for example, a plurality of inks of different concentrations for the same color.

When the resin dispersed ink is used as in the foregoing configuration, for example, the particles contained in the ink become greater in size than when the pigment is directly contained in the ink, and the solid component of the ink becomes less likely to aggregate. Thus, by using the resin dispersed ink, for example, as the dark ink, it is possible to appropriately produce dark inks of high concentrations without increasing ink viscosity.

With the foregoing configuration, the weather resistance of the ink against light and water can be appropriately increased because of the configuration with the colorant being dispersed in the binder resin. With this configuration, by using the resin dispersed ink, for example, as the light i is possible to appropriately produce light inks of low concentrations. The weather resistance of the ink can be sufficiently increased also when, for example, a dye is used as the colorant. This makes it possible to more appropriately produce light inks of even lower concentrations.

It is therefore possible with the foregoing configuration to, for example, appropriately use a dark ink of sufficiently high concentration, and a light ink of sufficiently low concentration, as required. This makes it possible to appropriately perform high-quality printing, for example.

The colors of the first-color ink ejected from the inkjet heads may differ from each other, provided that, for example, the difference arises from how the ink is colored, or occurs within a margin of coloring error. For example, the colors of the first-color ink ejected from the inkjet heads may differ from each other to such an extent that these colors can be regarded as the same colors corresponding to the first color. More specifically, for example, when the printing apparatus uses YMCK inks for printing, and the first color is magenta, the colors of the first-color ink ejected from the inkjet heads may differ from each other to such an extent that, for example, these inks can be substantially regarded as magenta inks. When the first color is cyan, the colors of the first-color ink ejected from the inkjet heads may differ from each other to such an extent that, for example, these inks can be substantially regarded as cyan inks. As used herein, ink being substantially magenta or cyan is irrespective of various color designations used for, for example, ink products, and means that, for example, the ink is used as magenta ink or cyan ink in a printing apparatus performing color printing with YMCK inks.

The average particle diameter of the binder resin particles in the resin dispersed ink is preferably 300 nm or more, and more preferably 400 nm or more. With this configuration, it is possible to appropriately prevent, for example, ink bleeding on the medium, aggregation of binder resin particles, and deterioration of the colorant while appropriately maintaining ejection stability of the ink through the inkjet head. The binder resin particles may have an average particle diameter of, for example, 800 nm or more. With this configuration, for example, ink bleeding on the medium can be more reliably prevented.

Preferably, the average particle diameter of the binder resin particles in the resin dispersed ink is not greater than 1/10 of the diameter of the nozzles of the inkjet head. With this configuration, for example, ejection stability can be more appropriately improved. Preferably, the binder resin particles in the resin dispersed ink are substantially in the shape of a sphere, an ellipsoid, or a disc. With this configuration, for example, ink ejection stability can be more appropriately improved.

The binder resin particles in the resin dispersed ink may be particles formed by emulsion polymerization or suspension polymerization of a binder resin material monomer and the colorant. With this configuration, for example, the binder resin particles can easily be formed into substantially the shape of a sphere or an ellipsoid. Ejection stability also can be appropriately maintained, for example, even when the particle size of the binder resin is increased.

The average content ratio of the binder resin and the colorant in the binder resin particles of the resin dispersed ink is preferably 20:80 to 95:5 in terms of a weight ratio. With this configuration, for example, particle precipitation of the binder resin can be more appropriately suppressed. The average content ratio is more preferably 75:25 to 95:5, further preferably 65:35 to 85:15.

The average particle diameter of the colorant in the resin dispersed ink is preferably 50 nm or less. With this configuration, for example, the ink color characteristic further improves, and more vivid printing can be performed. Because the colorant is encapsulated in the binder resin particles, the weather resistance of the ink can appropriately improve even when the colorant average particle diameter is as small as 50 nm or less.

In the resin dispersed ink, a resin different from the binder resin may be dissolved in the dispersion medium. With this configuration, for example, ink viscosity can be more appropriately adjusted. Further, for example, when the resin dispersed ink is dried to fix on the medium, the additional resin can serve as a binder, and the binder resin can more strongly bind to each other when the ink on the medium is dried to form a coating by the binding of the binder resin. This makes it possible to more appropriately fix the ink on the medium.

Configuration 2: The plurality of inkjet heads may include: a first inkjet head that ejects ink droplets of a first resin-dispersed ink containing particles of the binder resin colored in the color of the first-color ink of a first concentration; and a second inkjet head that ejects ink droplets of a second resin-dispersed ink containing particles of the binder resin colored in the color of the first-color ink of a second concentration lower than the first concentration.

With this configuration, for example, the resin dispersed ink can be used as both the dark ink and the light ink corresponding to the first color. It is therefore possible with this configuration to more appropriately use, for example, a dark ink of sufficiently high concentration, and a light ink of sufficiently low concentration. This makes it possible to appropriately perform high-quality printing, for example.

When the gradation inks of the same color are used, the dark ink and the light ink contain the colorant (a pigment or a dye) in different contents, or contain different colorants. This may result in the dark ink and the light ink having different properties when, for example, a pigment or a dye is directly contained in the ink. The difference in the properties is believed to particularly increase when, for example, the dark ink and the light ink have a large concentration difference for improving printing accuracy over a wider brightness range. Any such difference in the properties of the inks used in an inkjet printer makes it difficult, for example, to match printing conditions with the properties of each ink, and high-quality printing may not be appropriately performed.

On the other hand, the colorant is dispersed in the binder resin when the resin dispersed ink is used as both the dark ink and the light ink corresponding to the first color. This makes the ink properties to be less likely to be affected by the colorant content, or the type of the colorant. It is therefore possible with this configuration to, for example, appropriately reduce the difference in the properties of the dark ink and the light ink in using gradation inks of the same color. This makes it possible to more appropriately perform high-quality printing with the dark ink and the light ink.

Configuration 3: The second resin-dispersed ink and the first resin-dispersed ink may contain the binder resin particles in the same content ratio. It is possible with this configuration to, for example, more appropriately reduce the difference in the properties of the dark ink and the light ink. This makes it possible to more appropriately perform high-quality printing with the dark ink and the light ink.

The content ratio is, for example, the volume ratio (volume %) of the binder resin in a given ink volume. By "same binder resin particle content ratio", it may mean substantially the same content ratio. By "substantially the same content ratio", it means, for example, the same content ratio by production design. The content ratio by production design may be, for example, a ratio as calculated from the materials used for production. The same content ratio by production design may be the same content ratio that takes into account a margin of error for production. Preferably, the first resin-dispersed ink and the second resin-dispersed ink contain the binder resin in the same content ratio in terms of a weight ratio (weight %).

Configuration 4: The binder resin particles contained in the second resin-dispersed ink and in the first resin-dispersed ink may have the same average particle diameter. It is possible with this configuration to, for example, more appropriately reduce the difference in the properties of the dark ink and the light ink. This makes it possible to more appropriately perform high-quality printing with the dark ink and the light ink.

By "same binder resin particle average particle diameters", it may mean that the average particle diameters are substantially the same. By "substantially the same average particle diameters", it means that, for example, the average particle diameters are the same by production design. The same average particle diameters by production design may be, for example, the same average particle diameters that take into account a margin of error for production.

Configuration 5: The binder resin particles in the first resin-dispersed ink and in the second resin-dispersed ink may be colored by the same pigment encapsulated in the binder resin particles, and the content ratio of the pigment encapsulated in the binder resin particles may be made smaller in the second resin-dispersed ink than in the first resin-dispersed ink such that first-color ink with the second resin-dispersed ink with the first color of the second concentration lower than the first concentration is utilized to color the binder resin particles of the second resin-dispersed ink. It is therefore possible with this configuration to appropriately use the resin dispersed ink, for example, as the dark ink and the light ink. This makes it possible to appropriately perform high-quality printing with the dark ink and the light ink.

Configuration 6: The binder resin particles of the first resin-dispersed ink may be colored in the color of the first-color ink of the first concentration with a first pigment encapsulated in the binder resin particles of the first resin-dispersed ink, and the binder resin particles of the second resin-dispersed ink may be colored in the color of the first-color ink of the second concentration with a second pigment different from the first pigment and encapsulated in the binder resin particles of the second resin-dispersed ink. It is possible with this configuration to appropriately use the resin dispersed ink, for example, as the dark ink and the light ink. This makes it possible to appropriately perform high-quality printing with the dark ink and the light ink.

Configuration 7: The binder resin particles of one of the first resin-dispersed ink and the second resin-dispersed ink may be colored by a pigment encapsulated in the binder resin particles, and the binder resin particles of the other of the first resin-dispersed ink and the second resin-dispersed ink may be colored by a dye. It is possible with this configuration to appropriately use the resin dispersed ink, for example, as the dark ink and the light ink. This makes it possible to appropriately perform high-quality printing with the dark ink and the light ink.

Configuration 8: The binder resin particles of the first resin-dispersed ink may be colored in the color of the first-color ink of the first concentration by a pigment encapsulated in the binder resin particles of the first resin-dispersed ink, and the binder resin particles of the second resin-dispersed ink may be colored by a dye in the color of the first-color ink of the second concentration lower than the first concentration.

With this configuration, for example, the concentration of the dark ink can be appropriately and sufficiently increased with the pigment used as the colorant of the first resin-dispersed ink. It is also possible to appropriately and sufficiently lower the concentration of the light ink with the dye used as the colorant of the second resin-dispersed ink.

When the concentration of the light ink is to be decreased, for example, with a pigment used as the colorant of the light ink, there are cases where the ink fails to sufficiently hide the background color (for example, white) of the medium, and the printed image may appear white. Such a problem does not occur in the foregoing configuration in which the dye is used as the colorant of the second resin-dispersed ink.

It is therefore possible with the foregoing configuration to appropriately use the resin dispersed ink, for example, as the dark ink and the light ink. This makes it possible to appropriately perform high-quality printing with the dark ink and the light ink.

Configuration 9: The binder resin particles in the first resin-dispersed ink and in the second resin-dispersed ink may be colored by a dye. It is possible with this configuration to appropriately use the resin dispersed ink, for example, as the dark ink and the light ink. This makes it possible to appropriately perform high-quality printing with the dark ink and the light ink.

In the foregoing configurations, the binder resin particles in the first resin-dispersed ink and/or the second resin-dispersed ink may be colored by both a pigment and a dye. For example, the binder resin particles of the first resin-dispersed ink used as the dark ink may be colored by both a pigment and a dye.

Configuration 10: The colored binder resin particles may have a color difference of 30 or more between the first resin-dispersed ink and the second resin-dispersed ink.

With this configuration, for example, the color reproduction locus can have a straight line for the colors developed by the first resin-dispersed ink and the second resin-dispersed ink with some color difference. This makes it possible to appropriately suppress the color blur of the developed color.

Preferably, for example, the first resin-dispersed ink and the second resin-dispersed ink have a color difference that can be regarded as the same color corresponding to the first color. For example, the color difference is preferably 50 or less, more preferably 40 or less.

Configuration 11: A method for printing using an inkjet scheme, the method including printing with a plurality of inkjet heads that eject ink droplets of a first-color ink of at least one color selected from a plurality of colors, wherein the plurality of inkjet heads respectively eject ink droplets of different concentrations of the first-color ink, and at least one of the plurality of inkjet heads ejects ink droplets of a resin dispersed ink, and the resin dispersed ink is a ink in which dispersing particles of a colored binder resin as a dispersoid is dispersed in a dispersion medium. The same effects as obtained in, for example, configuration 1 also can be obtained with this configuration.

Configuration 12: An ink set comprising inks for use in a printing apparatus that prints according to an inkjet scheme with a plurality of inkjet heads that eject ink droplets of at least one color selected from a plurality of colors, wherein the plurality of inkjet heads respectively eject ink droplets of different concentrations of the first-color ink, the ink set including a plurality of inks ejected through the plurality of inkjet heads, wherein at least one of the plurality of inks is a resin dispersed ink, and the resin dispersed ink is a ink in which dispersing particles of a colored binder resin as a dispersoid is dispersed in a dispersion medium.

The same effects as obtained in, for example, configuration 1 also can be obtained with this configuration.

The present invention can more appropriately perforin high-quality printing with, for example, gradation inks.

BRIEF DESCRIPTION OF THE DRAWINGS

FIGS. 1(a) to 1(c) are diagrams representing an example of a printing apparatus according to an embodiment of the present invention, in which FIG. 1(a) shows an exemplary configuration of a relevant portion of the printing apparatus, FIG. 1(b) shows an exemplary configuration of a dark M ink, and FIG. 1(c) shows an exemplary configuration of a light M ink.

FIGS. 2(a) and 2(b) are diagrams representing an example of a resin dispersed ink used in the embodiment of the present invention, in which FIG. 2(a) shows an exemplary configuration of a binder resin contained in the resin dispersed ink of the embodiment, and FIG. 2(b) is a flowchart representing an example of an ink producing method of the embodiment of the present invention.

FIGS. 3(a) to 3(c) are diagrams representing a state of the ink in each step during a printing process, in which FIG. 3(a) shows a state of the ink before landing on a medium, FIG. 3(b) shows a state of the ink landed on the medium and heated by a heater, and FIG. 3(c) shows a state of the ink after further heating the medium with the heater.

DESCRIPTION OF THE EMBODIMENTS

Figure 1:
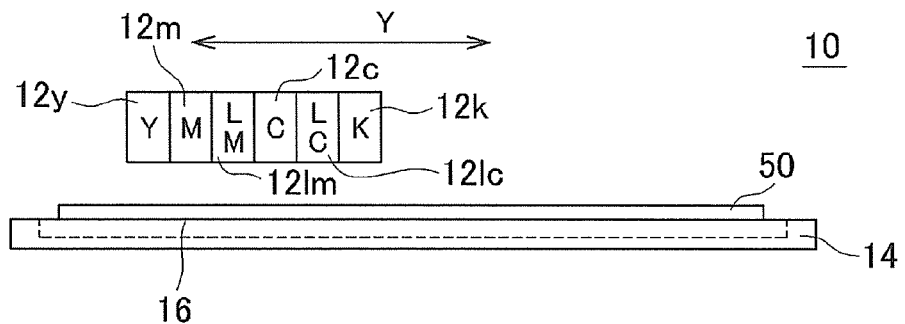
Figure 1:
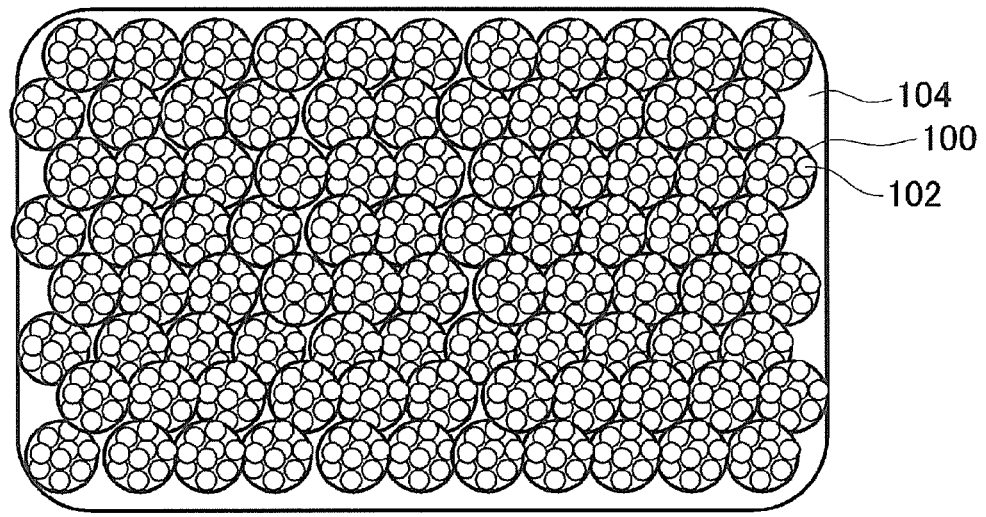
Figure 1:
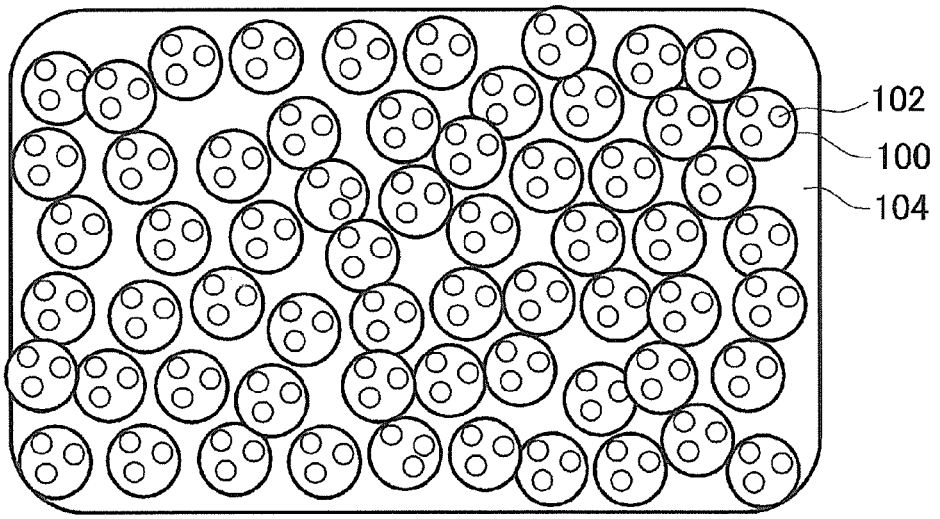

An embodiment of the present invention is described below with reference to the accompanying drawings. FIGS. 1(a) to 1(c) are diagrams representing an example of a printing apparatus 10 according to an embodiment of the present invention. FIG. 1(a) shows an exemplary configuration of a relevant portion of the printing apparatus 10. The printing apparatus 10 of the present embodiment is an inkjet printer that performs color printing on a medium 50 with YMCK inks, and includes a plurality of inkjet heads 12y, 12m, 12lm, 12c, 12lc, and 12k (hereinafter, "inkjet heads 12y to k") for ejecting ink droplets according to the inkjet scheme. The printing apparatus 10 also includes a table 14 and a heater 16.

The inkjet head 12y ejects ink droplets of the Y (yellow) ink. The inkjet heads 12m and 12lm eject ink droplets of the M (magenta) ink. The inkjet heads 12c and 12lc eject ink droplets of the C (cyan) ink. The inkjet head 12k ejects ink droplets of the K (black) ink.

In the printing apparatus 10 of this embodiment, it is equipped with the inkjet heads 12m and 12lm each eject the magenta ink (hereinafter, "M ink") of a magenta color. It is also equipped with the inkjet heads 12c and 12lc each eject the cyan ink (hereinafter, "C ink") of a cyan color. The M ink and C ink each represent an example of a first-color ink of a first color.

In the present embodiment, the inkjet heads 12m and 12lm eject ink droplets of M inks of different concentrations. The inkjet head 12m ejects ink droplets of a dark concentrated M ink (hereinafter, "dark M ink"). The inkjet head 12lm ejects ink droplets of a magenta ink of a low concentration (hereinafter, referred to as "light M ink"). The inkjet heads 12c and 12lc eject ink droplets of C inks of different concentrations. The inkjet head 12c ejects ink droplets of a dark concentrated C ink (hereinafter, "dark C ink"). The inkjet head 12lc ejects ink droplets of a cyan ink of a lighter concentration (hereinafter, "light C ink"). That is, the printing apparatus 10 uses a plurality of M and C inks of different concentrations for printing.

As used herein, "M ink concentration" is the concentration of the color developed by the M ink on the medium 50. Likewise, "C ink concentration" is the concentration of the color developed by the C ink on the medium 50. The concentrations of these colors may be, for example, concentrations of the ink droplets ejected on the medium 50 in the pre-set ejection concentrations.

The table 14 is a board-like member provided to hold the medium 50. In the present embodiment, the medium 50 is mounted on the top surface of the table 14, and held opposite the inkjet heads 12y to k. The heater 16 is a heating member for heating the medium 50. In the present embodiment, for example, the heater 16 is provided in the table 14, opposite the inkjet heads 12y to k, and heats the medium 50 to fix the ink droplets landed on the medium 50.

Depending on the type of the ink composition used, for example, an ultraviolet light source may be additionally provided that fixes the ink on the medium 50 by irradiation of UV light. The ultraviolet light source or some other fixing unit may replace the heater 16, for example.

Though not described in detail, the printing apparatus 10 has a configuration the same as or similar to, for example, known inkjet printers, except for the differences described above and as follows. For example, the printing apparatus 10 is configured to perform a main scan operation with the inkjet heads 12y to k in the predetermined main scan direction (Y direction), and to move the inkjet heads 12y to k relative to the medium 50 in the sub scan direction (X direction) orthogonal to the main scan direction.

In this way, for example, each different location of the medium 50 can be appropriately printed with the inkjet heads 12y to k. It is also possible with the dark and light M and C inks to appropriately perform high-quality printing, for example.

The following description more specifically describes the inks used in the present embodiment. Beginning with the M ink, a detailed description is presented below. FIG. 1(b) shows an exemplary configuration of the dark M ink. FIG. 1(c) shows an exemplary configuration of the light M ink.

In the present embodiment, ink droplets of the dark M ink and the light M ink respectively ejected by the inkjet heads 12m and lm are droplets of resin dispersed ink. The resin dispersed ink is an ink that contains particles of colored binder resin 100 as a dispersoid in a dispersion medium 104, which is, for example, a solvent such as water, as illustrated in FIGS. 1(b) and 1(c). In the resin dispersed ink, the binder resin 100 is colored by a colorant 102. The binder resin 100 thus serves as a color material in the resin dispersed ink.

In the present embodiment, the dark M ink is an example of a first resin-dispersed ink. The light M ink is an example of a second resin-dispersed ink. The inkjet head 12m is an example of a first inkjet head. The inkjet head 12lm is an example of a second inkjet head.

In the present embodiment, the colorant 102 is a pigment, dispersed in particles of the binder resin 100 to color these particles. The binder resin 100 in the dark M ink and the binder resin 100 in the light M ink are colored by the same pigment encapsulated in the binder resin particles. Encapsulating the pigment in binder resin 100 particles means, for example, dispersing the pigment in binder resin 100 particles.

In the present embodiment, the binder resin 100 of the dark M ink is colored magenta in a predetermined first concentration with the pigment encapsulated in, for example, a predetermined content ratio. The binder resin 100 of the light M ink is colored magenta in a second concentration lower than the first concentration with the pigment encapsulated in a smaller content ratio than in the binder resin 100 of the dark M ink. The inkjet head 12m ejects ink droplets of the resin dispersed ink containing particles of the binder resin 100 colored magenta in the first concentration. The inkjet head 12lm ejects ink droplets of the resin dispersed ink containing particles of the binder resin 100 colored magenta in the second concentration lower than the first concentration. In the present embodiment, for example, the resin dispersed ink can be appropriately used as the dark M ink and the light M ink.

In the present embodiment, the same configuration as used for the M inks is used for the inks of the other colors. For example, a resin dispersed ink the same as or similar to the dark M ink is used for the dark C ink, except for the colorant 102. Likewise, a resin dispersed ink the same as or similar to the light M ink is used for the light C ink, except for the colorant 102. In this way, the resin dispersed ink can be appropriately used as, for example, the dark C ink and the light C ink.

A resin dispersed ink the same to or similar to the dark M ink and the light M ink is used for the Y and K inks, except for the colorant 102. For example, a resin dispersed ink the same as or similar to the dark M ink is used for the dark Y and K ink, except for the colorant 102. Likewise, a resin dispersed ink the same as or similar to the light M ink is used for the light Y and K ink, except for the colorant 102. In this way, the resin dispersed ink can be appropriately used as, for example, the Y and K inks.

With this configuration, the colorant 102 in each ink is dispersed in the binder resin 100, and as such the ink properties are less likely affected by the amount and the type of the colorant 102 used. Thus, for example, the inks according to the present embodiment can be appropriately prevented from having greatly different properties. This makes it possible to more appropriately perform high-quality printing with the dark ink and the light ink, for example.

Further, for example, the dark ink and the light ink according to the present embodiment can be appropriately prevented from having greatly different properties even when these inks have a large concentration difference. The dark ink and the light ink can thus be appropriately used, for example, in sufficiently high concentration and low concentration, respectively, as required. This makes it possible to more appropriately perform high-quality printing, for example.

In the present embodiment, for example, the colorant is dispersed in the binder resin 100, and the weather resistance of the inks against light and water can be appropriately increased. Further, for example, because the particles contained in the resin dispersed ink become greater in size than when the pigment is directly contained in the ink, the solid component of the ink becomes less likely to aggregate. This makes it possible to appropriately produce high-concentration dark inks, for example, such as dark M ink and dark C ink, without increasing ink viscosity.

The colorant used to color the binder resin 100 may be a dye, instead of a pigment. In this case, dispersing the colorant in the binder resin particles means, for example, dissolving the colorant dye in the binder resin 100 particles. The binder resin 100 particles may be colored with, for example, both a pigment and a dye.

As described above, the present embodiment allows for more appropriate printing with, for example, the gradation inks of different color concentrations, making it possible to more appropriately perform high-quality printing, for example.

As described above, in the present embodiment, the binder resin 100 is contained as color material in the ink, and it is the binder resin 100 itself that is colored to provide gradation. This makes it possible to appropriately prevent, for example, aggregation of the pigment in the ink and uneven pigment distributions upon fixing the ink to the medium 50. Further, in the present embodiment, the dark ink and the light ink can have the same or essentially the same binder resin 100 density in the ink. It is therefore possible to appropriately prevent, for example, a thickness difference between the ink layers formed on the medium 50 with the printed dark ink and light ink. Further, the dark ink and the light ink can be printed under the same print condition settings such as for preventing bleeding.

The dark M ink color and the light M ink color may differ from each other, provided that, for example, the difference arises from how the ink is colored, or occurs within a margin of coloring error. The colors of the dark M ink and the light M ink are, for example, the colors given to their respective binder resin 100 particles. The colors of the dark M ink and the light M ink may differ from each other to such an extent that, for example, these inks can be substantially regarded as magenta inks. The dark C ink color and the light C ink color may differ from each other, provided that, for example, the difference arises from how the ink is colored, or occurs within a margin of coloring error. The colors of the dark C ink and the light C ink are, for example, the colors given to their respective binder resin 100 particles. The colors of the dark C ink and the light C ink may differ from each other to such an extent that, for example, these inks can be substantially regarded as cyan inks.

More specifically, the dark M ink and the light M ink may have a color difference of 30 or more. With this configuration, for example, the color reproduction locus can have a straight line for the colors developed by the gradation inks with some color difference. This makes it possible to more appropriately suppress color blur in the developed color. The dark C ink and the light C ink may have a color difference of 30 or more. Preferably, color difference is, for example, 50 or less, more preferably 40 or less.

The properties and other features of the binder resin 100 used as color material in the resin dispersed ink of the present embodiment are described below in greater detail. FIGS. 2(a) and 2(b) are diagrams representing an example of the resin dispersed ink used in the present embodiment, in which FIG. 2(a) shows an exemplary configuration of the binder resin 100 contained in the resin dispersed ink of the present embodiment. As described above, the resin dispersed ink used in the present embodiment contains the binder resin 100 (dispersoid), and a dispersion medium (solvent). The binder resin 100 is colored by the colorant 102, which may be a pigment or the like.

In the present embodiment, for example, the resin dispersed inks of different colors preferably have the same properties, except for the colorant 102. For example, the resin dispersed inks of different colors and concentrations preferably have the same volume solid component ratio (P/V/Sol). More specifically, for example, the resin dispersed inks of different colors and concentrations desirably contain the binder resin 100 particles in the same ratio. The content ratio is, for example, the volume ratio (volume %) of the binder resin in a given ink volume. It is also preferable that the resin dispersed inks of different colors and concentrations contain the binder resin in the same weight ratio (weight %). It is also desirable to set the same average particle diameter for the binder resin 100 particles.

With the foregoing configuration, for example, it is possible to more appropriately suppress the property differences between the different color inks, and the property differences between the dark ink and the light ink of the same color. This makes it possible to more appropriately perform high-quality printing with the dark ink and the light ink, for example.

As used herein, "same ink properties" means that, for example, the inks, by design, are adjusted to have the same properties. For example, the binder resin 100 particles of the same content ratio or the same average particle diameter may mean substantially the same content ratio or substantially the same average particle diameter. By "substantially the same content ratio", it means, for example, the same content ratio by production design. The same content ratio by production design may be, for example, the same ratio as calculated from the materials used for production, or the same ratio that takes into account a margin of error for production. These also apply to other parameters of the binder resin 100.

The following describes more specific configurations of the binder resin 100 and the colorant 102. The specific material of the binder resin 100 used in the resin dispersed ink of the present embodiment is not particularly limited, as long as it is not soluble in the vehicle, and is preferably at least one resin selected from high molecular compounds curable or cured by photo or heat polymerization. As used herein, "vehicle" refers to a component other than the binder resin 100 dispersing or dissolving fine particles such as the colorant 102 in the ink of the present embodiment, and is intended to include, for example, a solvent (dispersion medium), an additive, and a co-solvent.

The specific material of the binder resin 100 may be a monomer, an oligomer, or a low molecular resin that cures through polymerization reaction under heat or light, for example, by irradiation of energy rays such as ultraviolet light, electron beam, and radiation, etc. For example, the binder resin 100 particles may be particles formed by emulsion polymerization or suspension polymerization of a binder resin material monomer and the colorant. In this way, for example, the binder resin 100 particles can easily be formed into substantially the shape of a sphere or an ellipsoid. Ejection stability through the inkjet heads also can be appropriately maintained, for example, even when the particle size of the binder resin 100 is increased.

More specific examples of the binder resin 100 include: vinyl resin, acrylic resin, alkyd resin, polyester resin, urethane resin, styrene resin, styrene copolymer resin, silicon resin, fluoro resin, epoxy resin, phenoxy resin, polyolefinic resin, and modified resin thereof. Acrylic resin, polyurethane resin, polyester resin, and acrylic resin are preferred, and acrylic resin is particularly preferred.

Other examples of the binder resin 100 include natural rubber latex, styrene butadiene latex, styrene-acryl latex, and polyurethane latex. Preferably, these binder resins are used in the form of, for example, liquid concentrates, either directly or after emulsion polymerization reaction. In this way, the unpolymerized low viscosity liquid resin becomes more likely to form a spherical shape upon being dispersed in water. When using such resin, the binder resin may be of a polymer-dispersion type that requires a dispersant, or a self-dispersion type (see JP-A-2001-152063 for reference).

The cured high molecular compounds may be, for example, various synthetic latexes, including, for example, natural rubber (natural rubber latex), polybutadiene (EBR latex), styrene-butadiene copolymer (SBR latex), acrylonitrile-butadiene copolymer (NBR latex), methylmethacrylate-butadiene copolymer (MBR latex), 2-vinylpyridine-styrene-butadiene copolymer (VP latex, vinylpyridine latex), polychloroprene (chloroprene latex), polyisoprene (IR latex), polystyrene (polystyrene latex), polyurethane (polyurethane latex, polyurethane emulsion), acrylate polymer (acryl latex, acrylate emulsion), polyvinyl acetate (vinyl acetate emulsion), vinyl acetate copolymer (such as vinyl acetate acryl emulsion), vinyl acetate-ethylene copolymer (such as EVA emulsion), acrylate-styrene copolymer (acrylstyrene emulsion), polyethylene (polyethylene emulsion), vinyl chloride copolymer (vinyl chloride latex), vinylidene chloride copolymer (vinylidene chloride latex), and epoxy (epoxy emulsion). These may be used alone or in combination. It is also possible to use a low glass-transition-point (TG) resin and a high-fastness resin having a high TG in combination to improve adhesion for the medium 50 (see FIG. 1(a)) and fixability under low-temperature heat.

In the inks of the present embodiment, the average particle diameter of the binder resin 100 is preferably 300 nm or more, more preferably 400 nm or more. The average particle diameter of the binder resin 100 particles is the average particle diameter of the particles of the binder resin 100 dispersed in the dispersion medium. With this configuration, it is possible to appropriately prevent, for example, ink bleeding on the medium 50, aggregation of binder resin particles, and deterioration of the colorant while appropriately maintaining ejection stability of the ink through the inkjet head. The binder resin particles may have an average particle diameter of, for example, 800 nm or more. With this configuration, for example, ink bleeding on the medium 50 can be more reliably prevented. Preferably, the average particle diameter of the binder resin 100 particles is no greater than 1/10 of the diameter of the nozzles of the inkjet head. With this configuration, for example, ejection stability can be more appropriately improved. Preferably, the binder resin 100 particles are substantially in the shape of a sphere, an ellipsoid, or a disc. With this configuration, for example, ink ejection stability can be more appropriately improved.

The concentration of the binder resin 100 particles in the ink may be appropriately set according to the intended use. For example, when dispersing pigment fine particles as the colorant 102 in the binder resin 100 particles, the binder resin 100 is preferably 5 volume % to 70 volume %, further preferably 7 volume % to 40 volume % with respect to the total ink amount.

The colorant 102 dispersed in the binder resin 100 particles is not particularly limited, as long as it is not soluble in the vehicle, and may be selected from various colorants according to the intended use. Specifically, the colorant particle may be, for example, at least one particle selected from the group consisting of an organic pigment, an inorganic pigment, a disperse dye, an acidic dye, a reaction dye, titanium oxide, a magnetic particle, alumina, silica, ceramic, carbon black, a metal nanoparticle, and an organic metal. Examples of the metal nanoparticle material include gold, silver, copper, and aluminum, etc. Titanium oxide may preferably be used to provide a white coating.

The average particle diameter of the colorant 102 is preferably 50 nm or less. With this configuration, for example, the ink color further improves, and more vivid printing can be performed. Because the colorant 102 is encapsulated in the binder resin particles, the lightfastness of the ink can appropriately improve even when the colorant average particle diameter is as small as 50 nm or less. The average particle diameter of the colorant 102 is more preferably 20 nm or less. As an example of such a configuration, a nanopigment may be used as the colorant 102 to provide the binder resin 100 as a nanodispersion resin.

The method used to form the colorant 102 as a microparticulate of the foregoing particle diameters, or the method used to make fine particles of the colorant 102 may be appropriately selected according to the colorant of interest and the intended use from mechanical pulverization methods (such as by using a roll crusher, a ball mill, a jet mill, a sand grinder mill, and an edge runner), crystallization methods (such as a water crystallization method, a hydrothermal method, and a thermal decomposition method), gas phase methods as represented by CVD (Chemical Vapor Deposition), and liquid phase methods (such as emulsion polymerization). Fine particles of a certain particle size distribution can be obtained by controlling the particles within a certain particle diameter distribution during production, or classifying particles with a wide particle size distribution after the production.

In the ink of the present embodiment, for example, a plurality of colorant 102 particles are dispersed or dissolved in the binder resin 100 particles. Specifically, for example, 5 or more colorant 102 particles are preferably dispersed or dissolved. One or more kinds of the colorant 102 may be dispersed or dissolved in the binder resin 100 particles. The content ratio of the binder resin 100 and the colorant 102 in the binder resin 100 particles is preferably 20:80 to 95:5 in terms of an average weight ratio. With this configuration, for example, particle precipitation of the binder resin can be more appropriately suppressed. The average content ratio is more preferably 75:25 to 95:5, further preferably 65:35 to 85:15.

The solvent is not particularly limited, as long as it does not dissolve the colorant 102, and a variety of dispersion media may be used for different uses. A specific example of the dispersion medium is water. For its safety and environmental friendliness, water is preferable for use in applications such as common inkjet printer inks. Preferably, water is used with a moisturizer, because, when used alone, water dries quickly, and causes clogging of the inkjet head nozzles. When the dispersion medium on the medium 50 is evaporated by heating, it is preferable to add an organic solvent to water to prevent ink bleeding. Aside from water, other solvents such as hydrophilic solvents may be used as the dispersion medium.

When the main component of the dispersion medium is water and/or hydrophilic solvent, it is preferable to treat the surface of the binder resin 100 by hydrophilic treatment. With this configuration, the binder resin 100 particles desirably disperse in the dispersion medium because the particle surface of the binder resin 100 in contact with water or hydrophilic solvent is given affinity for water or hydrophilic solvent. It is therefore possible with this configuration to prevent ink separation inside the nozzles, and reliably eject predetermined amounts of ink through the nozzles even when, for example, the particle diameter of the binder resin 100 is increased. The affinity for the dispersion medium is maintained on the hydrophilic binder resin surface. Accordingly, the materials selected for the binder resin 100 and the colorant 102 do not need to be hydrophilic, and various materials can be used for the binder resin 100 and the colorant 102.

Preferably, the hydrophilic treatment is, for example, an emulsification process that emulsifies the surface with an emulsifier, or a process which introduces a hydrophilic group to the surface. With this configuration, for example, the particle surface of the binder resin 100 can be appropriately rendered hydrophilic.

The ink of the present embodiment may contain an additive, in addition to the binder resin 100 particles with the colorant 102 encapsulated, and the dispersion medium. The additive may be appropriately selected according to the intended use, and may be, for example, a surfactant, a coupling agent, a buffer, a biocide, a chelating agent, a viscosity adjuster, or a solvent. The additive may be dispersed in the binder resin 100 particles, or may exist in the dispersion medium, outside of the binder resin 100 particles.

The binder resin 100 itself may be colored with a dye, and used as particles. For example, a polyester resin encapsulating a disperse dye may be heated to dissolve the disperse dye and dye the resin with the disperse dye, or a nylon resin mixed with an acidic dye or a reaction dye may be heated to dissolve the dye, and dye the resin with the acidic dye or the reaction dye. These may then be used as binder resin 100 particles. In this way, a clear, non-bleeding, vivid inkjet printing ink can be obtained.

In the ink of the present embodiment, a resin different from the binder resin 100 may be dissolved in the dispersion medium. With this configuration, for example, ink viscosity can be more appropriately adjusted. Further, for example, the additional resin can serve as a binder, and the binder resin 100 can more strongly bind to each other when the ink on the medium 50 is dried to form a coating by the binding of the binder resin. This makes it possible to more appropriately fix the ink on the medium 50.

Figure 2:
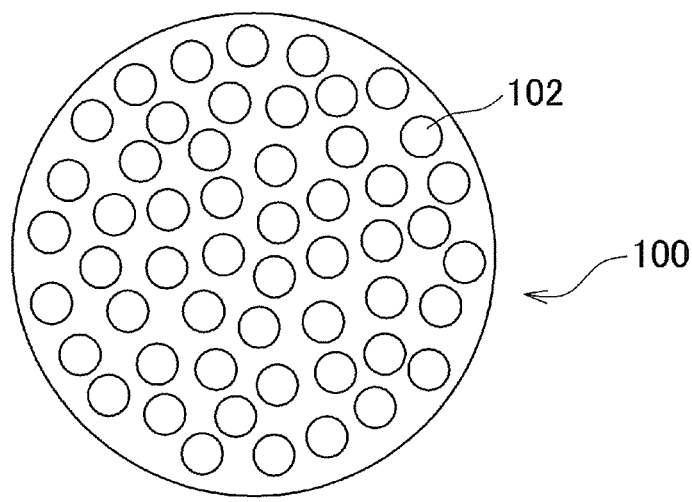
Figure 2:
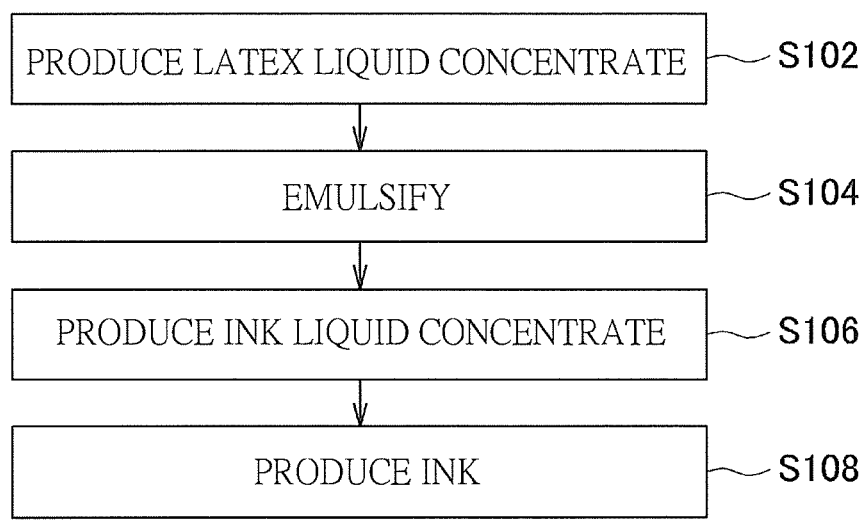

A resin dispersed ink producing method of the present embodiment is described below. FIG. 2(*b*) is a flowchart representing an example of the ink producing method of the present embodiment, in which the binder resin 100 is a heat-curable high molecular compound, the colorant 102 is a pigment fine particle, and the solvent (dispersion medium) is water. The following method also can be used to produce the ink when the binder resin 100 or other ink components have different configurations. In this case, the method should be partially modified according to the type of the binder resin 100 and the other ink components used.

The ink producing method of the present embodiment begins with production of a liquid concentrate of the high molecular compound (step S102). Here, for example, pigment fine particles to be dispersed in particles of the high molecular compound are added and dispersed in the liquid concentrate of the high molecular compound. Additives may be used as may be required by the intended use.

The pigment fine particles produced during preparation of step S102 may be produced by using, for example, a build-up method. In the build-up method, the fine particles are produced from a solid-phase material (raw material) produced through the reaction, supersaturation, nucleation, and growth of gaseous or liquid phase materials, which atoms, molecules, or ions are fed to the reaction in this order, and the order can be characterized by the order of purity, from highest to lowest. In industry, the method is used for the synthesis of high-purity fine particles with a particle diameter of several nanometers to several tenth nanometers. The build-up method is described in, for example, Japanese Patent No. 3936558.

The liquid concentrate of the high molecular compound is emulsified (step S104). Step S104 may be performed by using, for example, an apparatus configured from a container and an agitator. In this case, for example, the liquid concentrate of the high molecular compound formed of, for example, an unreacted monomer is added into the container, and the agitator is added with water or some other solvent for dispersing the high molecular compound particles. Thereafter, for example, the liquid concentrate is pumped from the container to the agitator through a pipe, and agitated at high speed with an agitating blade while being added into the agitator. This forms an emulsion of spherical particles of controlled particle diameters in the liquid concentrate of the high molecular compound dispersed in water or some other solvent.

Devices other than the mechanical agitators, such as ultrasonic agitators, used for emulsification and dispersion purposes, also may be used for the emulsification. The liquid concentrate contains the pigment in the form of a dispersion, and the pigment fine particles are dispersed in the particles of the liquid concentrate of the high molecular compound forming the emulsion. The viscosity of the liquid concentrate suppresses aggregation of the pigment fine particles in the liquid concentrate of the high molecular compound. The liquid concentrate of the high molecular compound can thus form particles in water with the pigment fine particles uniformly dispersed therein.

The liquid concentrate of the high molecular compound is emulsified or suspended to produce an ink liquid concentrate (step S106). In step S106, for example, the liquid concentrate may be emulsified or suspended by forming a rubber from the liquid concentrate through heating or polymerization reaction (using, for example, a cross-linking agent mixed in water). The emulsification or suspension of the liquid concentrate of the high molecular compound fixes the pigment fine particles in the high molecular compound particles, and completely prevents reaggregation. It is not necessarily required to emulsify or suspend the liquid concentrate of the high molecular compound, and, in some cases, the next step may be performed with the particles of the liquid concentrate being dispersed in water.

Finally, the ink liquid concentrate obtained in step S106 is diluted to the desired concentration to obtain an ink of the desired concentration or viscosity (step S108). In step S108, additives may be added to adjust the ink surface tension, as appropriate.

Figure 3:
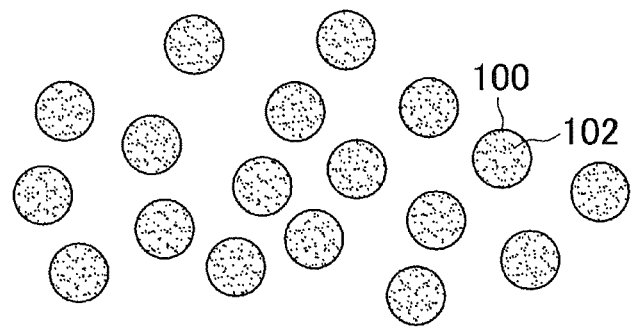
Figure 3:
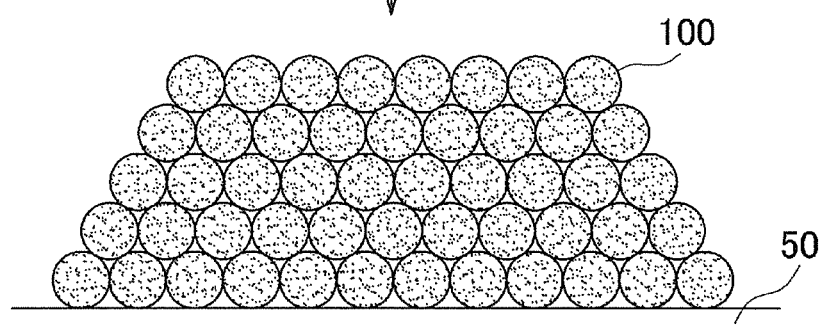
Figure 3:
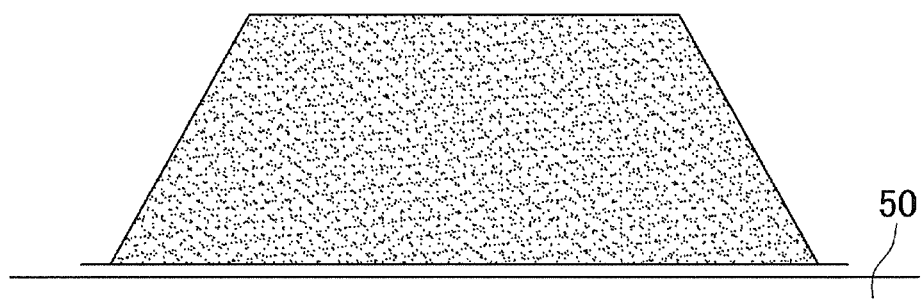

The following describes an example of ink states during the printing of the ink produced as above. FIGS. 3(a) to 3(c) represent a state of the ink in each step during a printing process. FIG. 3(a) shows a state of the ink before landing on the medium 50. In this state, the binder resin 100 in the ink is dispersed in the dispersion medium.

FIG. 3(b) shows a state after the ink has landed on the medium 50, and heated with the heater 16 (see FIG. 1(a)). In this state, the binder resin 100 in the ink is layered on the medium 50. By being heated with the heater 16, the dispersion medium contained in the ink has at least partially evaporated, and the ink viscosity has been increased.

FIG. 3(c) shows an example of an ink state after the medium 50 is further heated with the heater 16. Further heating of the medium 50 sufficiently removes the dispersion medium contained in the ink, and, for example, the binder resin 100 in the ink binds to each other, and forms a coating. This fixes the ink on the medium 50.

Here, when the binder resin 100 is, for example, a heat-curable high molecular compound, the heater 16 may heat the medium 50, for example, at a temperature equal to or greater than the curing temperature of the binder resin 100 contained in the ink on the medium 50. With this configuration, for example, the ink can be more strongly fixed to the medium 50 by the heat curing of the binder resin 100 in the ink.

The heater 16 may heat the medium 50 at higher temperatures to melt the cured binder resin 100, and fix an image to the medium 50, for example. With this configuration, for example, the binder resin 100 can appropriately fuse by being heated and melted on the medium 50. For example, the fused binder resin 100 fixes to the medium 50 after cooling to a certain temperature following the heating. With this configuration, for example, the ink can be more strongly fixed to the medium 50.

For example, a high molecular compound that cures by irradiation of light such as ultraviolet light may be used as the binder resin 100. In this case, for example, it is preferable to cure the binder resin 100 by irradiation of UV light after the dispersion medium in the ink has evaporated under the heat of the heater 16. It is also possible with this configuration to more strongly fix the ink to the medium 50, for example.

Various methods of coloring the binder resin 100 in the ink are described below. FIGS. 1(a) to 1(c) through FIGS. 3(a) to 3(c) have been described through the case of primarily using a pigment as the colorant of the binder resin 100. FIGS. 1(a) to 1(c) are based on the configuration in which colors are imparted by encapsulating the same pigment for the dark ink and the light ink of the same color. However, the method of coloring the binder resin 100 is not limited to this, and other methods may be used.

FIGS. 4(a) to 4(f) are diagrams explaining different methods of coloring a dark ink and a light ink of the same color, each representing an exemplary method of coloring a dark ink and a light ink.

In the following, the dark ink will be described as, for example, a dark M ink or a dark C ink. The light ink will be described as, for example, a light M ink or a light C ink. The dark ink and the light ink have the same characteristics, except for the color concentration of the binder resin 100.

Figure 4:
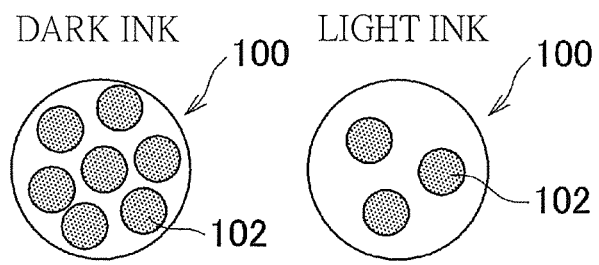
FIGS. 4(a) to 4(f) are diagrams explaining different methods of coloring a dark ink and a light ink of the same color, each representing an exemplary method of coloring a dark ink and a light ink.
Figure 4:
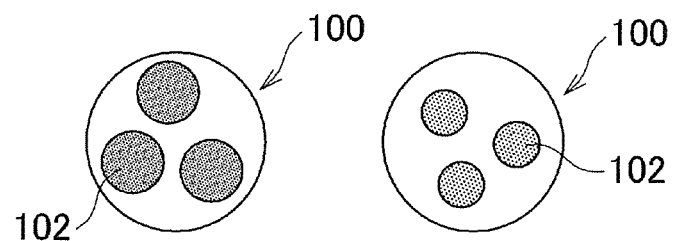
Figure 4:
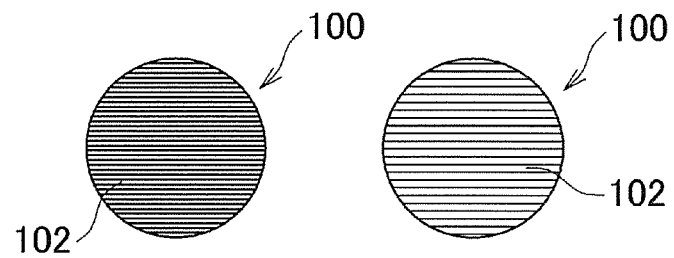
Figure 4:
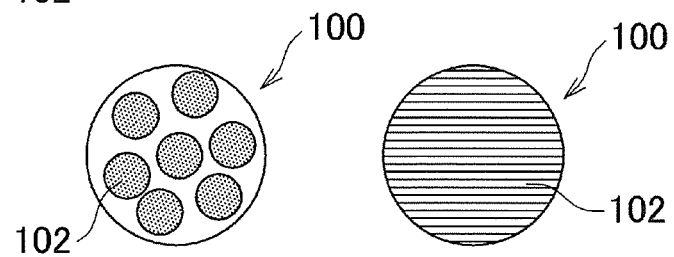
Figure 4:
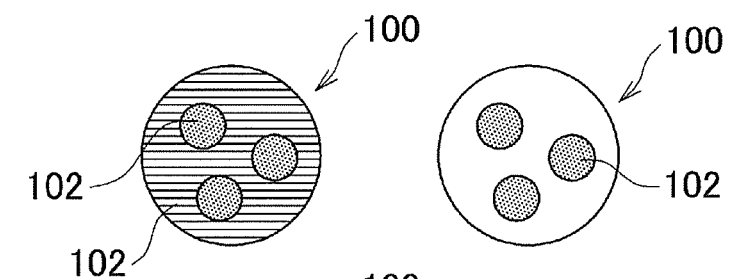
Figure 4:
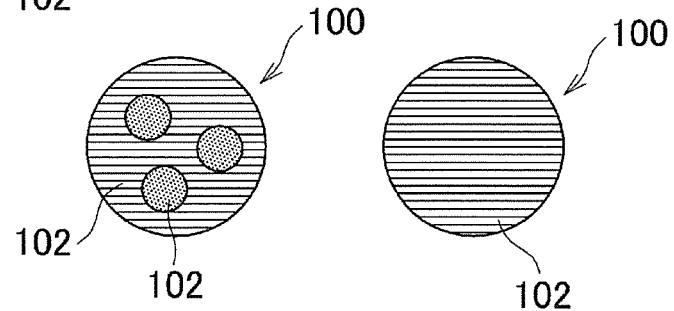

FIG. 4(a) represents an exemplary configuration in which the same pigment is used for the colorant 102 of the binder resin 100 of the dark ink and the light ink. In this case, as described above with reference to FIGS. 1(a) to 1(c) and elsewhere, the binder resin 100 of the light ink encapsulates the pigment in a smaller content ratio than in the binder resin 100 of the dark ink. With this configuration, for example, the concentrations of the dark ink and the light ink can be appropriately set.

FIG. 4(b) represents an exemplary configuration in which different pigments are used for the colorant 102 of the binder resin 100 of the dark ink and the light ink. In this case, the binder resin 100 of the dark ink encapsulates, for example, a first pigment, and is colored by the color of this pigment (for example, magenta or cyan, or some other color) in a first concentration. The binder resin 100 of the light ink encapsulates a second pigment different from the first pigment, and is colored by the color of the second pigment in a second concentration lower than the first concentration. With this configuration, for example, the concentrations of the dark ink and the light ink can be appropriately set.

FIG. 4(c) represents an exemplary configuration in which a dye is used for the colorant 102 of the binder resin 100 of the dark ink and the light ink. In this case, for example, the binder resin 100 is colored by the colorant 102, or the dye, dissolved in the binder resin 100. For example, the same dye is used for the dark ink and the light ink, but dissolved in different amounts in the binder resin 100. With this configuration, for example, the concentrations of the dark ink and the light ink can be appropriately set. Different dyes may be used for the dark ink and the light ink.

FIG. 4(d) represents an exemplary configuration in which a pigment is used for the colorant 102 of the binder resin 100 of one of the dark ink and the light ink, and a dye is used for the colorant 102 of the binder resin 100 of the other ink. In this case, for example, the binder resin 100 particles of the dark ink encapsulate the pigment, and are colored by the color of this pigment in a first concentration. The binder resin 100 particles of the light ink containing the dye are colored by the color of the dye in a second concentration lower than the first concentration. With this configuration, for example, the concentrations of the dark ink and the light ink can be appropriately set.

Further, by using a pigment for the colorant 102 of the binder resin 100 of the dark ink, the ink concentration can be appropriately increased to a higher concentration. This makes it possible to appropriately use the dark ink of higher concentrations. By using a dye for the colorant 102 of the binder resin 100 of the light ink, it is possible to appropriately prevent the printed image from becoming white due to the background color (for example, white) of the medium even when, for example, the light ink has a low concentration. This makes it possible to appropriately use the light ink of lower concentrations. Depending on the concentrations of the dark ink and the light ink used, for example, a dye may be used to color the binder resin 100 of the dark color, and a pigment may be used to color the binder resin 100 of the light ink.

FIG. 4(e) represents an exemplary configuration in which a pigment and a dye are used for the colorant 102 of the dark ink, and a pigment is used for the colorant 102 of the light ink. With this configuration, for example, the concentration of the dark ink can be more appropriately increased. This makes it possible to, for example, appropriately set the concentrations of the dark ink and the light ink. In this configuration, the pigment used for the colorant 102 of the binder resin 100 of the light ink may be, for example, the same pigment used for the colorant 102 of the binder resin 100 of the dark ink, or may be different from the pigment used for the colorant 102 of the binder resin 100 of the dark ink.

FIG. 4(f) represents an exemplary configuration in which a pigment and a dye are used for the colorant 102 of the dark ink, and a dye is used for the colorant 102 of the light ink. With this configuration, for example, the concentration of the dark ink can be more appropriately increased. This makes it possible to, for example, appropriately set the concentrations of the dark ink and the light ink. In this configuration, the dye used for the colorant 102 of the binder resin 100 of the light ink may be, for example, the same dye as used for the colorant 102 of the binder resin 100 of the dark ink, or may be different from the dye used for the colorant 102 of the binder resin 100 of the dark ink.

As described above, for example, the concentrations of the resin dispersed dark and light inks can be appropriately set in the present embodiment. This makes it possible to appropriately perform high-quality printing with the dark ink and the light ink.

As a variant configuration of the dark ink and the light ink, for example, only one of the dark ink and the light ink may be the resin dispersed ink. For example, the concentration of the dark ink can be appropriately and sufficiently increased by using the resin dispersed ink for the dark ink. The concentration of the light ink can be appropriately and sufficiently decreased when the resin dispersed ink is used for the light ink, for example. This makes it possible to perform high-quality printing with the dark ink and the light ink.

While the embodiment of the present invention has been discussed in the foregoing detailed explanation, the technical scope of the present invention is not limited by the description of the embodiment above, and the embodiment may be altered or improved in many ways, as would be obvious to a person of ordinary skill in the art. An embodiment based on such alterations and improvements is encompassed in the technical scope of the present invention, as would be obvious from the appended claims.

The present invention can preferably be used for, for example, printing apparatuses.

What is claimed is:

1. A priming apparatus for printing using an inkjet scheme, the apparatus comprising:
    a plurality of inkjet heads that eject ink droplets of a first-color ink of at least one color selected from a plurality of colors,
    wherein the plurality of inkjet heads respectively eject ink droplets of different concentrations of the first-color ink, and
    at least one of the plurality of inkjet heads ejects ink droplets of a resin dispersed ink toward a medium, and the resin dispersed ink is a ink in which pre-colored binder resin particles as a dispersoid are dispersed in a dispersion medium;
    the plurality of inkjet heads comprise:
        a first inkjet head that ejects ink droplets of a first resin-dispersed ink, which is the resin dispersed ink, containing first binder resin particles pre-colored in the color of the first-color ink of a first concentration; and
        a second inkjet head that ejects ink droplets of a second resin-dispersed ink, which is the resin dispersed ink, containing second binder resin particles pre-colored in the color of the first-color ink of a second concentration lower than the first concentration.

2. The printing apparatus according to claim 1, wherein the binder resin particles contained in the second resin-dispersed ink and in the first resin-dispersed ink have the same average particle diameter.

3. The printing apparatus according to claim 1, wherein the binder resin particles in the first resin-dispersed ink and in the second resin-dispersed ink are colored by the same pigment encapsulated in the binder resin particles, and
    the content ratio of the pigment encapsulated in the binder resin particles is made smaller in the second resin-dispersed ink than in the first resin-dispersed ink such that first-color ink with the second concentration lower than the first concentration is utilized to color the binder resin particles of the second resin-dispersed ink.

4. The printing apparatus according to claim 1, wherein the binder resin particles of the first resin-dispersed ink are colored in the color of the first-color ink of the first concentration with a first pigment encapsulated in the binder resin particles of the first resin-dispersed ink, and
    the binder resin particles of the second resin-dispersed ink are colored in the color of the first-color ink of the second concentration with a second pigment different from the first pigment encapsulated in the binder resin particles of the second resin-dispersed ink.

5. The printing apparatus according to claim 1, wherein
the binder resin particles of one of the first resin-dispersed ink and the second resin-dispersed ink are colored by a pigment encapsulated in the binder resin particles, and
the binder resin particles of the other of the first resin-dispersed ink and the second resin-dispersed ink are colored by a dye.

6. The printing apparatus according to claim 5, wherein
the binder resin particles of the first resin-dispersed ink are colored in the color of the first-color ink of the first concentration by a pigment encapsulated in the binder resin particles of the first resin-dispersed ink, and
the binder resin particles of the second resin-dispersed ink are colored by a dye in the color of the first-color ink of the second concentration lower than the first concentration.

7. The printing apparatus according to claim 1, wherein
the binder resin particles in the first resin-dispersed ink and in the second resin-dispersed ink are colored by a dye.

8. A method for printing using an inkjet scheme, the method comprising:
printing with a plurality of inkjet heads that eject ink droplets of a first-color ink of at least one color selected from a plurality of colors,
wherein the plurality of inkjet heads respectively eject ink droplets of different concentrations of the first-color ink, and
at least one of the plurality of inkjet heads ejects ink droplets of a resin dispersed ink toward a medium, and the resin dispersed ink is a ink in which pre-colored binder resin particles as a dispersoid are dispersed in a dispersion medium;
the plurality of inkjet heads comprise:
a first inkjet head that ejects ink droplets of a first resin-dispersed ink containing first binder resin particles pre-colored in the color of the first-color ink of a first concentration; and
a second inkjet head that ejects ink droplets of a second resin-dispersed ink containing second binder resin particles pre-colored in the color of the first-color ink of a second concentration lower than the first concentration.

9. An ink set comprising inks for use in a printing apparatus that prints under an inkjet scheme with a plurality of inkjet heads that eject ink droplets of a first-color ink of at least one color selected from a plurality of colors, wherein the plurality of inkjet heads respectively eject ink droplets of different concentrations of the first-color ink, the ink set comprising:
a plurality of inks ejected through the plurality of inkjet heads, wherein at least one of the plurality of inks is a resin dispersed ink, and the resin dispersed ink is a ink in which pre-colored binder resin particles as a dispersoid are dispersed in a dispersion medium;
the plurality of inkjet heads comprise:
a first inkjet head that ejects ink droplets of a first resin-dispersed ink containing first binder resin particles pre-colored in the color of the first-color ink of a first concentration; and
a second inkjet head that ejects ink droplets of a second resin-dispersed ink containing second binder resin particles pre-colored in the color of the first-color ink of a second concentration lower than the first concentration.

10. The printing apparatus according to claim 1, wherein a content ratio of the second binder resin particles in the second resin-dispersed ink is as same as a content ratio of the first binder resin particles in first resin-dispersed ink.

* * * * *